United States Patent
Labrecque et al.

(10) Patent No.: US 11,999,618 B2
(45) Date of Patent: Jun. 4, 2024

(54) METHOD AND REACTOR FOR PRODUCING SYNTHESIS GAS FROM A CARBON AND HYDROGEN SOURCE IN THE PRESENCE OF AN OXY FLAME

(71) Applicant: HYDRO-QUÉBEC, Montréal (CA)

(72) Inventors: Raynald Labrecque, Shawinigan (CA); Robert Schulz, Sainte-Julie (CA); Michel Vienneau, Saint-Hubert (CA); Germain Larocque, Beloeil (CA)

(73) Assignee: HYDRO-QUÉBEC, Montréal (CA)

( * ) Notice: Subject to any disclaimer, the term of this patent is extended or adjusted under 35 U.S.C. 154(b) by 0 days.

(21) Appl. No.: 18/007,973

(22) PCT Filed: Jun. 3, 2021

(86) PCT No.: PCT/CA2021/050761
§ 371 (c)(1),
(2) Date: Dec. 2, 2022

(87) PCT Pub. No.: WO2021/243462
PCT Pub. Date: Dec. 9, 2021

(65) Prior Publication Data
US 2023/0249969 A1    Aug. 10, 2023

(30) Foreign Application Priority Data

Jun. 4, 2020   (CA) ................ CA 3081971

(51) Int. Cl.
*C01B 3/36* (2006.01)
*B01J 19/00* (2006.01)
(Continued)

(52) U.S. Cl.
CPC ........... *C01B 3/363* (2013.01); *B01J 19/0013* (2013.01); *B01J 19/2415* (2013.01); *C01B 3/12* (2013.01);
(Continued)

(58) Field of Classification Search
None
See application file for complete search history.

(56) References Cited

U.S. PATENT DOCUMENTS 3,639,261 A    2/1972   Slater
3,723,344 A    3/1973   Reynolds
(Continued)

FOREIGN PATENT DOCUMENTS

CA    2495335 A1    4/2004
CN    102918136 A   2/2013
(Continued)

OTHER PUBLICATIONS

F.Bustamante, et al., "High Temperature Kinetics of the Homogeneous Reverse Water-Gas Shift Reaction," AIChE Journal, May 2004, vol. 50, No. 5, pp. 1028-1041.
(Continued)

*Primary Examiner* — Colin W. Slifka
(74) *Attorney, Agent, or Firm* — Womble Bond Dickinson (US) LLP

(57) ABSTRACT

The technology relates to a method of producing synthesis gas comprising carbon monoxide (CO) and hydrogen ($H_2$), wherein the synthesis gas is produced by a reduction reaction of a first flow comprising a carbon source and an excess of hydrogen in contact with an Oxy-flame. The hydrogen comes from a reducing stream, a first portion of which ends up in the first flow, and a second part of which is used to generate the Oxy-flame by combustion of the hydrogen in the presence of a second flow comprising oxygen ($O_2$), the second flow coming from an oxidizing stream. The first flow and the second flow are at a distance from each other such that the Oxy-flame supports the reaction between the carbon (Continued)

source and the hydrogen. A reactor, which can have different configurations, is also proposed for implementing the method.

20 Claims, 9 Drawing Sheets

(51) Int. Cl.
  *B01J 19/24* (2006.01)
  *C01B 3/12* (2006.01)
  *C10G 2/00* (2006.01)
  *C10K 3/02* (2006.01)
(52) U.S. Cl.
  CPC ............... *C10G 2/34* (2013.01); *C10K 3/026* (2013.01); *B01J 2219/00157* (2013.01); *C01B 2203/0255* (2013.01); *C01B 2203/0283* (2013.01); *C01B 2203/0822* (2013.01); *C01B 2203/1241* (2013.01)

(56) References Cited

U.S. PATENT DOCUMENTS

| | | | |
|---|---|---|---|
| 3,919,114 | A | 11/1975 | Reynolds |
| 4,006,100 | A | 2/1977 | Crouch |
| 4,371,379 | A | 2/1983 | Brent et al. |
| 5,714,657 | A | 2/1998 | De Vries |
| 2009/0012188 | A1 | 1/2009 | Rojey et al. |
| 2010/0190874 | A1 | 7/2010 | Mamedov et al. |
| 2014/0288195 | A1 | 9/2014 | Castelli et al. |

FOREIGN PATENT DOCUMENTS

| | | |
|---|---|---|
| CN | 205717209 U | 11/2016 |
| CN | 108474048 A | 8/2018 |
| FR | 2963932 A1 | 2/2012 |
| WO | 2011/141635 A1 | 11/2011 |
| WO | 2017072649 A1 | 5/2017 |
| WO | 2017/115133 A1 | 7/2017 |
| WO | 2020114899 A1 | 6/2020 |
| WO | 2020/208008 A1 | 10/2020 |
| WO | 2021098980 A1 | 5/2021 |
| WO | 2021/185869 A1 | 9/2021 |
| WO | 2021/244980 A1 | 12/2021 |

OTHER PUBLICATIONS

Oh-Shim Joo, et al., "Carbon Dioxide Hydrogenation to Form Methanol via a Reverse-Water-Gas-Shift Reaction (the CAMERE Process)," Ind. Eng. Chem. Res. 1999, vol. 38, No. 5, pp. 1808-1812.

M.S. Spencer, "On the Activation Energies of the Forward and Reverse Water-Gas Shift Reaction," Catalysis Letters, 1995, vol. 32, pp. 9-13.

Philipp Kaiser, et al., "Production of Liquid Hydrocarbons with CO2 as Carbon Source based on Reverse Water-Gas Shift and Fischer-Tropsch Synthesis," Chemie Ingenieur Technik, 2013, vol. 85, No. 4, pp. 489-499.

Rene Kelling, et al., "Ceramic Counterflow Reactor for Efficient Conversion of CO2 to Carbon-Rich Syngas," Chemnie Ingenieur Technik, 2015, vol. 87, No. 6, pp. 726-733.

Office Action issued in CN Application No. 202180039534.3, dated Oct. 30, 2023 (w/translation) [22 pages].

METHOD AND REACTOR FOR PRODUCING SYNTHESIS GAS FROM A CARBON AND HYDROGEN SOURCE IN THE PRESENCE OF AN OXY FLAME

PRIORITY APPLICATION

This application is a National Stage of International Patent Application No. PCT/CA2021/050761, filed on Jun. 3, 2021, which claims priority to Canadian Patent Application No. CA 3,081,971, filed on Jun. 4, 2020, the disclosures of which are incorporated by reference in their entireties.

TECHNICAL FIELD

The present application relates to a method and a reactor for producing synthesis gas from a source of carbon and hydrogen ($H_2$). More particularly, the synthesis gas production method is carried out in the direct presence of an Oxy-flame to transform a flow comprising a source of carbon and hydrogen into synthesis gas.

STATE OF THE ART

The fight against climate change will have to involve, among other things, a substantial reduction in greenhouse gas (GHG) emissions, particularly those of $CO_2$ and methane. To do this, beyond any measure related to incremental improvements, drastic means will be necessary to be able to achieve the targeted objectives in terms of reducing GHG emissions. At present, considerable efforts are being made to minimize the consumption of fossil resources as a source of energy and also as a basic ingredient for several chemical syntheses. For the manufacture of products containing carbon in their atomic composition, the use of $CO_2$ as a basic reagent to provide the carbon source is a promising solution. $CO_2$ is found in the ambient air, but also in atmospheric discharges from industrial processes emitting $CO_2$ (e.g., cement plant, aluminum plant, steel plants, etc.). The process of capturing $CO_2$ from ambient air or discharged by industrial processes to recycle it for later use is also known as "Carbon Capture Utilization" (CCU). The $CO_2$ thus captured can be used as a carbon source for the production of a broad spectrum of products that can be considered carbon neutral, i.e., whose production and use cycle involves virtually no net emissions of GHGs. It is thus possible to produce carbon neutral synthetic fuels that can be used in existing infrastructures.

There are several ways to use $CO_2$ as a basic reagent to provide carbon. The most practical way consists in transforming the $CO_2$ into carbon monoxide (CO) according to the reaction (A) called "Reverse Water Gas Shift" or RWGS.

$$CO_2 + H_2 \rightarrow CO + H_2O(vapor) \quad (A)$$

By reacting $CO_2$ with an excess of hydrogen ($H_2$), one can produce hydrogen and CO-based mixtures. Such mixtures are called "synthesis gas" or "syngas". These synthesis gases can also contain some residual $CO_2$.

Synthesis gases can be used to produce a range of commodity chemicals. Among these products, one can find notably methanol and hydrocarbons such as those found in motor gasoline, diesel, kerosene.

Methanol is a platform molecule that can be used as a raw material for many other base products such as formaldehyde. Methanol is also known for its use in windshield washer fluid and as an industrial solvent. It can also be used as a fuel. Methanol can even be transformed into synthetic hydrocarbons. Finally, methanol can be transformed into dimethyl ether (DME), itself a chemical intermediate. DME is used, among other things, as a propellant for aerosols. DME can be used as a diesel engine fuel or as an alternative fuel to propane.

A known basic reaction for the production of methanol from synthesis gas is the following reaction (B):

$$CO + 2H_2 \rightarrow CH_3OH \quad (B)$$

Synthetic hydrocarbons can be produced from synthesis gas, according to the Fischer-Tropsch reaction (C):

Depending on the chemical products to be produced, $CO/H_2$ based mixtures useful as synthesis gas for these products must be balanced, i.e., they must contain the proper proportions of $H_2$ and CO. Considering reactions (B) and (C), it can be noted that, in theory, the synthesis gas (syngas) must essentially contain $H_2$ and CO according to an $H_2/CO$ molar ratio close to 2. More precisely, taking into account the possible presence of residual $CO_2$ in the synthesis gases, the molar proportions of the gases to be able to carry out the reactions (B) or (C) generally correspond to the ratios R1 or R2 of the following equations (D) and (E):

$$R1 = H_2/CO \geq 2 \quad (D)$$

A very large number of chemical and hydrocarbon syntheses can be carried out with syngas that can meet the R1 or R2 molar composition criteria. It should also be noted that it is possible to produce methane, $CH_4$, from synthesis gas. One mole of methane can be formed from 1 mole of CO and 3 moles of $H_2$.

The reaction of RWGS (A) is endothermic (reaction enthalpy of 41 kJ/mole at room temperature). According to the stoichiometry of this reaction, to produce 1 kg of CO, it takes 1.57 kg of $CO_2$ and 0.07 kg of $H_2$ and it is necessary to provide 1465 kJ or 0.4 kWh of thermal energy. To carry out this reaction, one generally uses catalytic bed reactors. However, the use of conventional catalysts to carry out reaction (A) does not make it possible to obtain high conversion rates. This means that the conversion per pass, that is, the conversion during the passage of $CO_2$ through a catalytic bed, turns out to be rather low. The reason is that, for reactors with catalytic beds, the temperature of operation is rather limited—we often talk about temperatures below 600° C. However, it is known that, thermodynamically, reaction (A) becomes rather favorable at higher temperature levels. This is illustrated by Table 1 which presents the value of the equilibrium constant as a function of temperature (at atmospheric pressure).

TABLE 1

Variation of the equilibrium constant of the reaction of RWGS with temperature

| T °C. | ΔH kJ/mole | K |
|---|---|---|
| 0 | 41.20 | 0.0000021 |
| 100 | 40.78 | 0.0002704 |
| 200 | 40.08 | 0.0043 |
| 300 | 39.22 | 0.0248 |
| 400 | 38.25 | 0.0830 |
| 500 | 37.22 | 0.1987 |
| 600 | 36.18 | 0.3822 |
| 700 | 35.14 | 0.6334 |
| 800 | 34.12 | 0.9439 |

TABLE 1-continued

Variation of the equilibrium constant of
the reaction of RWGS with temperature

| T<br>° C. | ΔH<br>kJ/mole | K |
|---|---|---|
| 900 | 33.13 | 1.3017 |
| 1000 | 32.19 | 1.6935 |
| 1100 | 31.30 | 2.1071 |
| 1200 | 30.46 | 2.5319 |
| 1300 | 29.65 | 2.9595 |
| 1400 | 28.89 | 3.3831 |
| 1500 | 28.16 | 3.7980 |

Of particular interest is a method for the production of synthesis gas from a carbon and hydrogen source. A method for the production of synthesis gas from $CO_2$ for example, and from hydrogen, without requiring the use of conventional solid catalysts, is also particularly interesting. A method to allow the preparation of synthesis gases useful for the manufacture of various chemical products is also attractive. Such a method will be described in the following.

SUMMARY

According to a first aspect, the present technology relates to a method of producing synthesis gas comprising carbon monoxide (CO) and hydrogen ($H_2$), wherein the synthesis gas is produced by a reduction reaction of a first flow comprising a carbon source and an excess of hydrogen in contact with an Oxy-flame, and wherein:
the hydrogen comes from a reducing stream, a first part of which ends up in the first flow and a second part is used to generate the Oxy-flame by combustion of hydrogen in the presence of a second flow comprising oxygen ($O_2$), the second flow coming from an oxidizing stream,
the first flow and the second flow are at a distance from each other such that the Oxy-flame supports the reaction between the carbon source and the hydrogen.

According to one embodiment, the method is such that the reduction reaction is carried out in the absence of solid catalyst.

According to another embodiment, the method is such that the Oxy-flame generates ionic species and free radicals which promote the conversion of the carbon source to CO.

According to another embodiment, the method is such that the carbon source comprises:
$CO_2$; or
at least one type of oxygenated molecules of formula $C_\alpha H_\beta O_\gamma$ wherein $\alpha$ is between 1 and 5, $\beta$ is between 2 and 10 and $\gamma$ is between 1 and 4; or
one or more hydrocarbons; or
a mixture of at least two of these carbon sources.

According to another embodiment, the carbon source comprises $CO_2$ and the reduction reaction comprises a reverse reaction of gas to water or "Reverse Water Gas Shift".

In another embodiment, the method is such that the reducing stream is hydrogen. In another embodiment, the reducing stream comprises hydrogen and the carbon source. In another embodiment, the reducing stream comprises hydrogen and $CO_2$.

According to another embodiment, the method is such that the reducing stream comprises hydrogen, $CO_2$ and at least one type of oxygenated molecules of formula $C_\alpha H_\beta O_\gamma$ where $\alpha$ is between 1 and 5, $\beta$ is between 2 and 10 and $\gamma$ is between 1 and 4.

According to another embodiment, the method is such that the oxidizing stream is oxygen. In another embodiment, the oxidizing stream comprises oxygen and $CO_2$.

According to another embodiment, the method is such that the reducing stream comprises only hydrogen, the oxidizing stream comprises only oxygen and the carbon source is supplied by an independent stream. According to another embodiment, the independent stream comprises $CO_2$. According to another embodiment, the independent stream comprises $CO_2$ and methane.

According to another embodiment, the method is such that the oxygen comes from a water electrolysis reaction.

According to another embodiment, the method is such that the hydrogen comes from a water electrolysis reaction.

According to another embodiment, the method is such that the carbon source comes from a gas mixture resulting from a biomass gasification or pyrolysis process.

According to another embodiment, the method is such that the reduction reaction is carried out at an average temperature of at least 600° C. According to another embodiment, the reduction reaction is carried out at an average temperature of at least 1200° C. According to another embodiment, the reduction reaction is carried out at an average temperature of at most 2200° C.

According to another embodiment, the method is such that the first flow and the second flow are at a distance from each other of between 0.1 mm and 100 mm. According to another embodiment, the first flow and the second flow are at a distance from each other of between 0.3 mm and 50 mm. According to another embodiment, the first flow and the second flow are at a distance from each other of between 0.6 mm and 30 mm.

According to another embodiment, the method is such that the carbon source comprises $CO_2$ and the reduction reaction is carried out using an $H_2/CO_2$ molar ratio of between 2 and 7.

According to another embodiment, the method is such that the carbon source comprises $CO_2$ and the reduction reaction is carried out using an $O_2/CO_2$ molar ratio of between 0.35 and 0.9.

According to another embodiment, the method is such that the reduction reaction is carried out using an $O_2/H_2$ molar ratio of between 0.1 and 0.3.

According to another embodiment, the method is such that the produced synthesis gas has an $H_2/CO$ molar ratio of at least 1.8. According to another embodiment, the produced synthesis gas has an $H_2/CO$ molar ratio of at least 2. According to another embodiment, the produced synthesis gas has an $H_2/CO$ molar ratio of between 1.8 and 5.0.

According to another embodiment, the method is such that the produced synthesis gas further comprises $CO_2$.

According to another embodiment, the method is such that the produced synthesis gas has a molar ratio of $H_2$, CO and $CO_2$ such that $(H_2-CO_2)/(CO+CO_2) \geq 2$.

According to another embodiment, the method further comprises cooling the synthesis gas to form a cooled synthesis gas.

According to another embodiment, the method further comprises condensing water contained in the cooled synthesis gas and recovering the water. According to another embodiment, at least a part of the recovered water is recycled to the cooling step.

According to another aspect, the present technology relates to the use of a synthesis gas produced by the method according to the present technology, for the manufacture of chemicals products or fuels.

According to another aspect, the present technology relates to the use of a synthesis gas produced by the method according to the present technology, for the manufacture of methanol or synthetic hydrocarbons.

According to another aspect, the present technology relates to a reactor for producing a synthesis gas comprising carbon monoxide (CO) and hydrogen ($H_2$), said reactor comprising:
- a reaction chamber wherein the synthesis gas is produced by a reduction reaction of a first flow comprising a carbon source and an excess of hydrogen in contact with an Oxy-flame,
- at least one first means for supplying the reaction chamber with a reducing stream comprising hydrogen, a first part of the reducing stream ending up in the first flow and a second part being used to generate the Oxy-flame in the reaction chamber, by combustion of hydrogen in the presence of a second flow comprising oxygen ($O_2$),
- at least one second means for supplying the reaction chamber with an oxidizing stream forming the second flow,
- the first flow and the second flow being at a distance from each other such that the Oxy-flame supports the reaction between the carbon source and the hydrogen.

According to one embodiment, the reactor is such that the reduction reaction is carried out in the absence of solid catalyst.

According to another embodiment, the reactor is such that the Oxy-flame generates ionic species and free radicals which promote the conversion of the carbon source to CO.

According to another embodiment, the reactor is such that the carbon source comprises:
- $CO_2$; or
- at least one type of oxygenated molecules of formula $C_\alpha H_\beta O_\gamma$ wherein $\alpha$ is between 1 and 5, $\beta$ is between 2 and 10 and $\gamma$ is between 1 and 4; or
- one or more hydrocarbons; or
- a mixture of at least two of these carbon sources.

According to another embodiment, the reactor is such that the carbon source comprises $CO_2$ and the reduction reaction is the reverse reaction of gas to water or "Reverse Water Gas Shift".

In another embodiment, the reactor is such that the reducing stream is hydrogen. In another embodiment, the reducing stream comprises hydrogen and the carbon source. In another embodiment, the reducing stream comprises hydrogen and $CO_2$.

According to another embodiment, the reactor is such that the reducing stream comprises hydrogen, $CO_2$ and at least one type of oxygenated molecules of formula $C_\alpha H_\beta O_\gamma$ where $\alpha$ is between 1 and 5, $\beta$ is between 2 and 10 and $\gamma$ is between 1 and 4.

According to another embodiment, the reactor is such that the oxidizing stream is oxygen. According to another embodiment, the oxidizing stream comprises oxygen and $CO_2$.

According to another embodiment, the reactor is such that the first means for supplying the reducing stream and the second means for supplying the oxidizing stream are tubes.

According to another embodiment, the reactor comprises a plurality of second means consisting of a plurality of tubes allowing the injection of the oxidizing stream into the reaction chamber, and a plurality of first means consisting of a plurality of openings allowing the injection of the reducing stream into the reaction chamber. According to another embodiment, each opening is defined by an annular space delimited by the outer diameter of one tube of the plurality of tubes and extending perpendicularly from the outer wall of the tube. According to another embodiment, the reactor further comprises a reducing stream distribution chamber separated from the reaction chamber by a separation wall, said distribution chamber and said separation wall being traversed by the plurality of tubes, the annular space extending perpendicularly from the outer wall of each tube also traversing the separation wall.

According to another embodiment, the reactor is such that the reducing stream is hydrogen which is supplied to the reaction chamber by the first means consisting of a first tube, the oxidizing stream is oxygen which is supplied to the reaction chamber by the second means consisting of a second tube, and the carbon source is supplied by an independent stream which is injected into the reaction chamber through at least one opening located in a wall of the reaction chamber. According to another embodiment, the opening is formed by a third tube concentric with the first tube and the second tube, the second tube forming the inner tube, the first tube forming an intermediate tube and the third tube forming an outer tube. According to another embodiment, the opening is formed by an annular space delimited by an internal diameter of the third tube and an external diameter of the first tube. According to another embodiment, the reactor further comprises a distribution chamber separated from the reaction chamber by a separation wall, said distribution chamber serving to supply the independent stream comprising the carbon source and being traversed by the first tube and the second tube. According to another embodiment, the reactor is such that the independent stream comprises $CO_2$. According to another embodiment, the reactor is such that the independent stream comprises $CO_2$ and methane.

According to another embodiment, the reactor is such that the oxygen comes from a water electrolysis reaction.

According to another embodiment, the reactor is such that the hydrogen comes from a water electrolysis reaction.

According to another embodiment, the reactor is such that the carbon source comes from a gas mixture resulting from a biomass gasification or pyrolysis process.

In another embodiment, the reactor is such that the reaction chamber reaches a temperature of at least 600° C. during the reduction reaction. In another embodiment, the reaction chamber reaches a temperature of at least 1200° C. during the reduction reaction. In another embodiment, the reaction chamber reaches a temperature of at most 2200° C. during the reduction reaction.

According to another embodiment, the reactor is such that the first flow and the second flow are at a distance from each other of between 0.1 mm and 100 mm. According to another embodiment, the first flow and the second flow are at a distance from each other of between 0.3 mm and 50 mm. According to another embodiment, the first flow and the second flow are at a distance from each other of between 0.6 mm and 30 mm.

According to another embodiment, the reactor is such that the carbon source comprises $CO_2$ and the reduction reaction is carried out using an $H_2/CO_2$ molar ratio of between 2 and 7. According to another embodiment, the source of carbon comprises $CO_2$ and the reduction reaction is carried out using an $O_2/CO_2$ molar ratio of between 0.35 and 0.9.

According to another embodiment, the reactor is such that the reduction reaction is carried out using an $O_2/H_2$ molar ratio of between 0.1 and 0.3.

According to another embodiment, the reactor is such that the produced synthesis gas has an $H_2/CO$ molar ratio of at least 1.8. According to another embodiment, the produced synthesis gas has an H₂/CO molar ratio of at least 2. According to another embodiment, the produced synthesis gas has an H₂/CO molar ratio of between 1.8 and 5.0.

According to another embodiment, the reactor is such that the produced synthesis gas further comprises $CO_2$.

According to another embodiment, the reactor is such that the produced synthesis gas has a molar ratio of $H_2$, CO et $CO_2$ such that $(H_2-CO_2)/(CO+CO_2) \geq 2$.

According to yet another aspect, the present technology relates to a system comprising the reactor as defined according to the present technology, coupled to a device for cooling the synthesis gas to form a cooled synthesis gas.

According to one embodiment, the system is such that the cooling device is a direct contact cooler.

According to another embodiment, the system further comprises a water condensing apparatus for recovering water from the cooled synthesis gas.

According to another embodiment, the system is such that the condensing apparatus is a cooler-condenser.

According to another embodiment, the system further comprises equipment for recycling at least a part of the recovered water to the cooling device.

DETAILED DESCRIPTION

Figure 1:
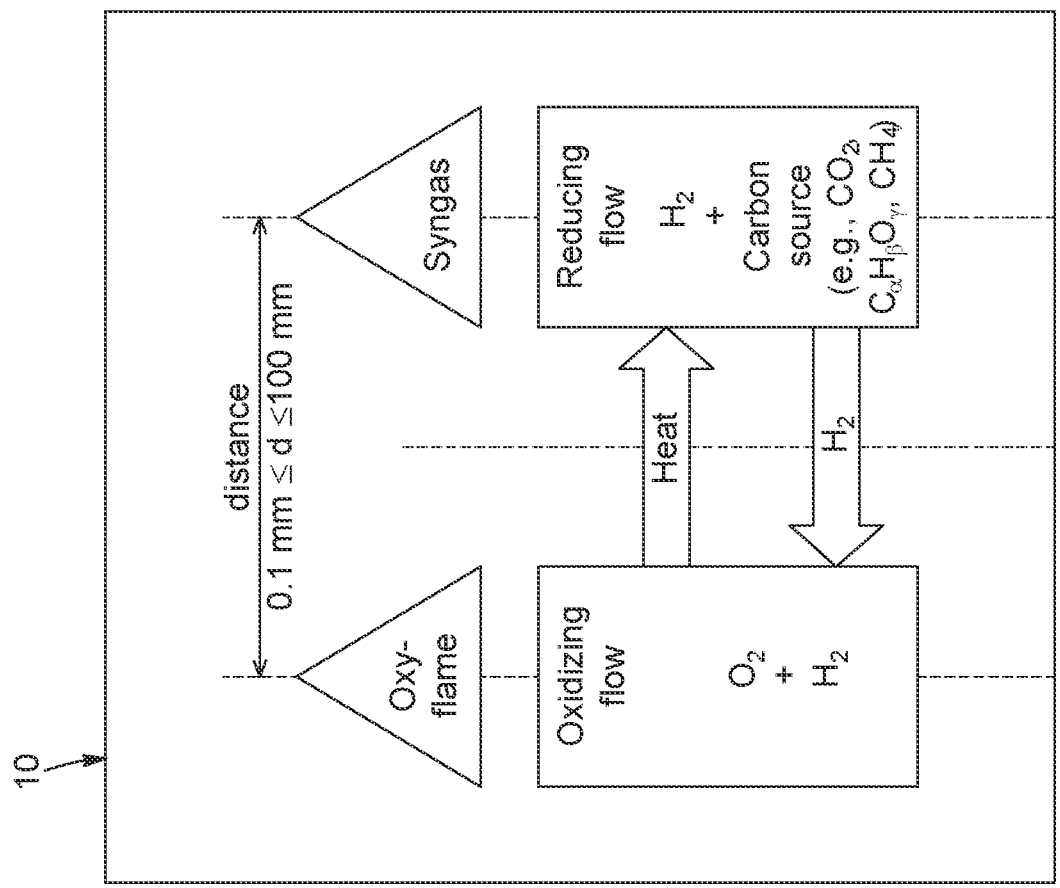
FIG. 1 is a schematic representation of the general operating principle of the present method to produce syngas.

All technical and scientific terms and expressions used herein have the same meanings as those generally understood by the person skilled in the art of the present technology. The definition of certain terms and expressions used are nevertheless provided below.

The term "about" as used in the present document means approximately, in the region of, and around. When the term "about" is used in connection with a numerical value, it modifies it, for example, above and below by a variation of 10% compared to the nominal value. This term can also take into account, for instance, the experimental error of a measuring device or the rounding of a value.

When an interval of values is mentioned in the present application, the lower and upper limits of the interval are, unless otherwise indicated, always included in the definition.

The chemical structures described here are drawn according to the conventions of the field. Also, when an atom, such as a carbon atom, as drawn appears to include an incomplete valence, then the valence will be assumed to be satisfied by one or more hydrogen atoms even if they are not explicitly drawn.

In the present description, the terms "synthesis gas" and "syngas" are used interchangeably to identify a gas mixture comprising at least carbon monoxide (CO) and hydrogen ($H_2$). In some embodiments, the syngas or syngas can comprise $CO_2$. According to one embodiment, the $H_2$/CO molar ratio in the synthesis gas is greater than or equal to 1. In other embodiments, the synthesis gas can have an $H_2$/CO molar ratio of at least 1.8, for example between 1.8 and 5.0. According to another embodiment, the $H_2$/CO molar ratio in the synthesis gas is greater than or equal to 2. Thus, the $H_2$/CO molar ratio in the synthesis gas can be 1.8 or 1.9 or 2.0 or 2.1 or 2.2 or 2.3 or 2.4 or 2.5 or 2.6 or 2.7 or 2.8 or 2.9 or 3.0 or 3.1 or 3.2 or 3.3 or 3.4 or 3.5 or 3.6 or 3.7 or 3.8 or 3.9 or 4.0 or 4.1 or 4.2 or 4.3 or 4.4 or 4.5 or 4.6 or 4.7 or 4.8 or 4.9 or 5.0. However, synthesis gases with different and various $H_2$/CO molar ratios can be obtained.

The term "stream" is used to describe the different gas streams which feed the reaction chamber in which the formation of the synthesis gas is carried out. As will be described in more detail below, the method uses at least one stream containing hydrogen ($H_2$) and at least one stream containing oxygen ($O_2$). The carbon source used in the method, depending on its nature, can be fed either by an independent stream, or by the $O_2$ containing stream, or by the $H_2$ containing stream. The streams entering the reaction chamber are in gaseous state. If necessary, reagents in the liquid state can be vaporized so that they arrive in the reaction chamber in gaseous form.

The term "flow" is used to describe the various gas flows that are involved in carrying out the synthesis gas production reaction, inside the reaction chamber. As will be described in more detail below, the reaction involves a reducing flow containing hydrogen ($H_2$) and the carbon source which are going to react with each other to form synthesis gas, and an oxidizing flow containing oxygen ($O_2$) which is going to react with hydrogen ($H_2$) to form an Oxy-flame.

The term "carbon source" describes the chemical compound(s) that are used to provide the carbon that ends up in the synthesis gas produced. Thus, the carbon source provides at least the carbon that ends up in the carbon monoxide (CO) being produced. Different chemical compounds can be used as a carbon source. According to one embodiment, the carbon source can comprise $CO_2$. According to another embodiment, the carbon source can comprise one or more types of oxygenated carbon-based molecules of formula $C_\alpha H_\beta O_\gamma$ where $\alpha$ is between 1 and 5, $\beta$ is between 2 and 10 and $\gamma$ is between 1 and 4. The carbon source can also comprise one or more hydrocarbons such as, for example, alkanes, alkenes and/or aromatics. It is also possible for the carbon source used to produce the synthesis gas to be a combination of two or more of the different sources described above. Thus, according to certain embodiments, the carbon source can comprise $CO_2$ and one or more oxygenated molecules of the $C_\alpha H_\beta O_\gamma$ type. According to other embodiments, the carbon source can comprise $CO_2$ and one or more hydrocarbons, for example $CO_2$ and methane. In the case where the carbon source only contains hydrocarbons, an intake of oxygen atoms will be required. This oxygen can be provided by $CO_2$, but it can also be supplied in the form of water vapor. According to some embodiments, the carbon source can comprise one or more hydrocarbons, $CO_2$ and water vapor. The water vapor, when required, can come from the reaction which generates the Oxy-flame (see reaction (G) below) and/or can be fed into the reaction chamber.

The present document therefore presents an innovative method for the production of synthesis gas from a carbon source. As stated previously, the carbon source can vary. In some embodiments, the carbon source comprises $CO_2$ which can generally derive two major categories of sources: anthropogenic sources, linked to human activities and natural sources, so-called biogenic. The present method can use $CO_2$ originating from both these types of sources and can also use pure $CO_2$. According to another embodiment, a gas mixture comprising $CO_2$ and one or more types of oxygenated molecules of formula $C_\alpha H_\beta O_\gamma$ where $\alpha$ is between 1 and 5, $\beta$ is between 2 and 10 and $\gamma$ is between 1 and 4 can be used. Alternatively, the carbon source can simply comprise one or more types of $C_\alpha H_\beta O_\gamma$ molecules.

According to another embodiment, a gas mixture comprising $CO_2$ and hydrocarbons, such as alkanes (e.g., methane), alkenes and/or aromatic molecules, can also be used. However, it is also possible to use only hydrocarbons as carbon source. According to some embodiments, the carbon source can comprise $CO_2$, one or more types of $C_\alpha H_\beta O_\gamma$ molecules and one or more types of hydrocarbons. A wide range of organic molecules, including products from fossil sources, which can optionally contain sulfur, can be present in the gas mixture providing the carbon source.

More specifically, the method of producing syngas is carried out by reacting the carbon source with an excess of hydrogen on contact with an Oxy-flame. According to the present technology, an "Oxy-flame" means a flame produced by the combustion of hydrogen in the presence of an oxidant such as oxygen ($O_2$) according to the following reaction (F):

$$H_2 + \tfrac{1}{2}O_2 \rightarrow H_2O(vapor) + Heat \qquad (F)$$

This flame is bright and radiant and provides the heat required to support the reaction that produces the synthesis gas from the carbon source. This flame can generate ionic species and free radicals which can catalyze the conversion of the carbon source to CO. According to certain embodiments, the Oxy-flame can make it possible to reach an average temperature, in the reaction chamber, of at least about 600° C. According to other embodiments, the average temperature reached in the reaction chamber is at least about 1200° C. The temperature reached in the reaction chamber can be up to about 2200° C. Thus, the reaction of producing the synthesis gas in the reaction chamber can be carried out at an average temperature of at least 600° C. up to about 2200° C. The Oxy-flame can be qualified as a "reducing oxy-flame" because the combustion reaction between hydrogen and oxygen takes place in the presence of an excess of hydrogen. In one embodiment, the oxidant which is used to produce the Oxy-flame can be an oxygen ($O_2$)-based mixture, preferably pure oxygen. By "pure" oxygen, it is understood that this does not necessarily mean a purity of 100%, but that the oxygen-based mixture substantially comprises $O_2$ and may be accompanied by certain impurities such as $N_2$, $H_2O$ for example.

As mentioned above, the reaction to form the synthesis gas is carried out in the presence of excess of hydrogen. By "excess of hydrogen", it will be understood that the quantity of hydrogen ($H_2$) must be sufficient on the one hand to allow the combustion reaction (F) to produce the Oxy-flame and on the other hand to be able to carry out the conversion reaction of the carbon source into synthesis gas. The amount of hydrogen required can be determined depending on the carbon source used and considering the stoichiometry of the reactions involved.

According to another embodiment which will be explained in more detail below, the hydrogen required in the present method as well as the oxygen used to produce the Oxy-flame, can, at least in part, result from a water electrolysis reaction. This can be even more advantageous if the water electrolysis system is powered by renewable electricity. The combustion which produces the Oxy-flame can be initiated using an ignition device, such as an electric arc, an incandescent wire, or any other known source of energy.

According to certain embodiments, the present method can produce a syngas essentially containing $H_2$ and CO in an $H_2$/CO molar ratio close to 2. According to a particular embodiment, the present method is suitable for the production of syngas whose composition meets the conditions shown by equations (D) and (E) reported above. This is made possible by varying the proportions of the different gas streams producing the oxidizing flow and the reducing flow.

FIG. 1 illustrates the general principle of the method's operation. A reducing flow (on the right in the figure) comprising at least hydrogen and the carbon source ends up in a reaction chamber (10). The heat required to convert the carbon source to CO is provided by means of a hot flame, called Oxy-flame, which is produced by the combustion of hydrogen in the presence of an oxidant such as oxygen (left part of the figure). Part of the hydrogen supplied to the reaction chamber can be used to produce the Oxy-flame (bottom arrow in the figure). Another part of the hydrogen supplied to the reaction chamber is used as such for producing the synthesis gas. The Oxy-flame, in addition to providing the heat required for the conversion reaction of the carbon source to CO, can generate ionic species and free radicals which can promote this conversion. The hydrogen is introduced in excess in the reaction chamber and a portion is evacuated with the CO to form the syngas. Overall, the entire process can be qualified as an "autothermal" process.

In the reaction chamber (10), there are therefore two distinct flows: a first which comes from an oxidizing gas with pure oxygen called oxidizing flow, and another flow, called reducing flow, resulting from a hydrogen-based reducing gas mixture and containing the carbon source. These two flows are close to each other. According to one embodiment, the two flows can be separated by a distance "d" from each other such that 0.1 mm≤d≤100 mm. According to another embodiment, the distance d separating the two flows may be such that 0.3 mm≤d≤50 mm. This distance can preferably be such that 0.6 mm≤d≤30 mm. Thus, the distance d separating the two streams can be 0.1 mm, 0.2 mm, 0.3 mm, 0.4 mm, 0.5 mm, 0.6 mm, 0.7 mm, 0.8 mm, 0.9 mm, 1 mm, 5 mm, 10 mm, 15 mm, 20 mm, 25 mm, 35 mm, 40 mm, 45 mm, 50 mm, 55 mm, 60 mm, 65 mm, 70 mm, 75 mm, 80 mm, 85 mm, 90 mm, 95 mm, 100 mm, or any distance between these values. It should be noted that the reducing and oxidizing flows which end up in the reaction chamber can come from various streams. As a matter of fact, the reducing flow comes from a reducing stream comprising at least $H_2$ and the oxidizing flow originates from an oxidizing stream comprising at least oxygen. However, the carbon source which ends up in the reducing flow in the reaction chamber, can be supplied either by the reducing stream, or by an independent stream, or by the oxidizing stream if this carbon source comprises $CO_2$ only.

Figure 2:
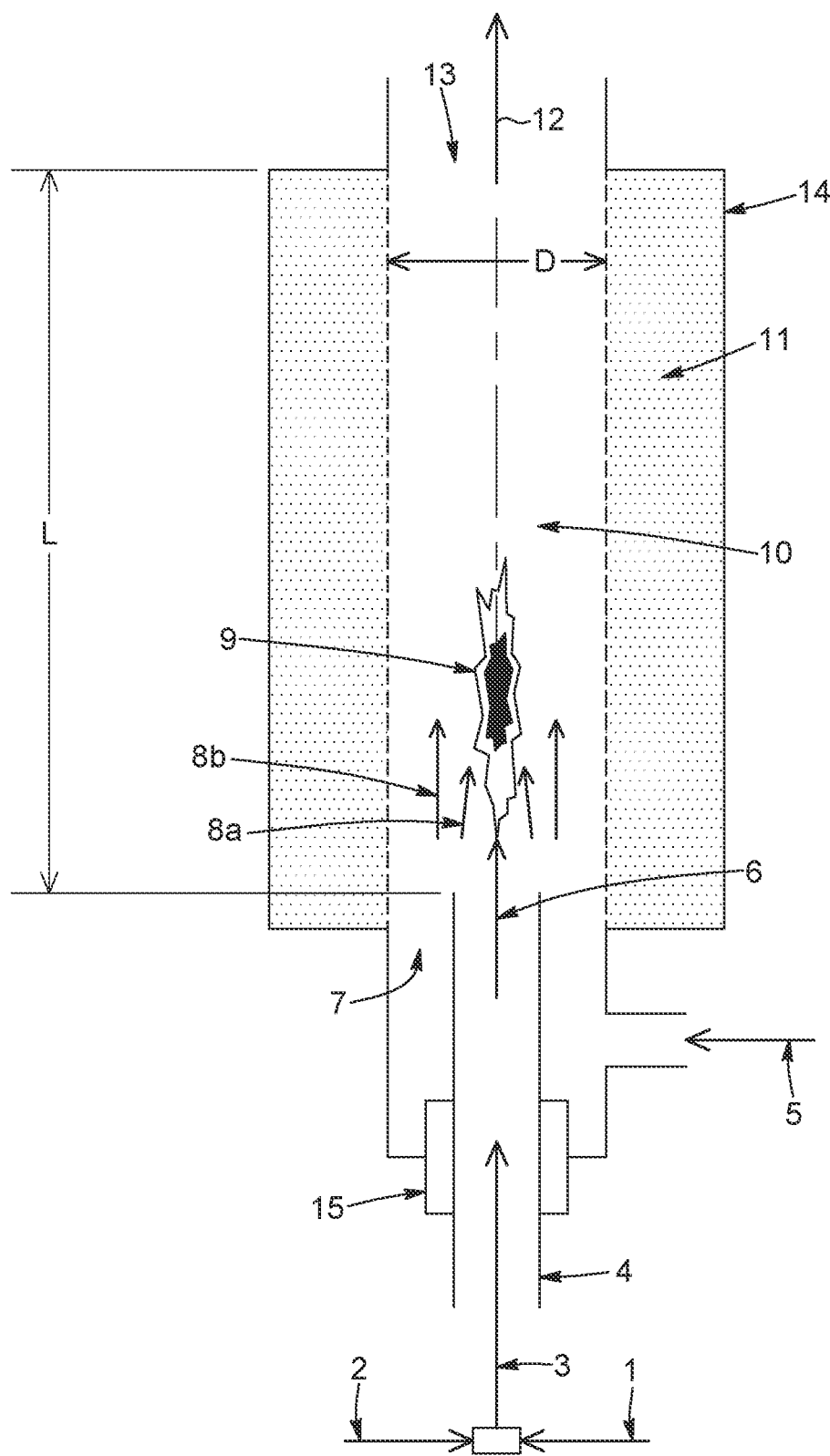
FIG. 2 shows a sectional view along the vertical of a reactor which can be used to carry out the method of producing syngas according to a first embodiment.
Figure 3:
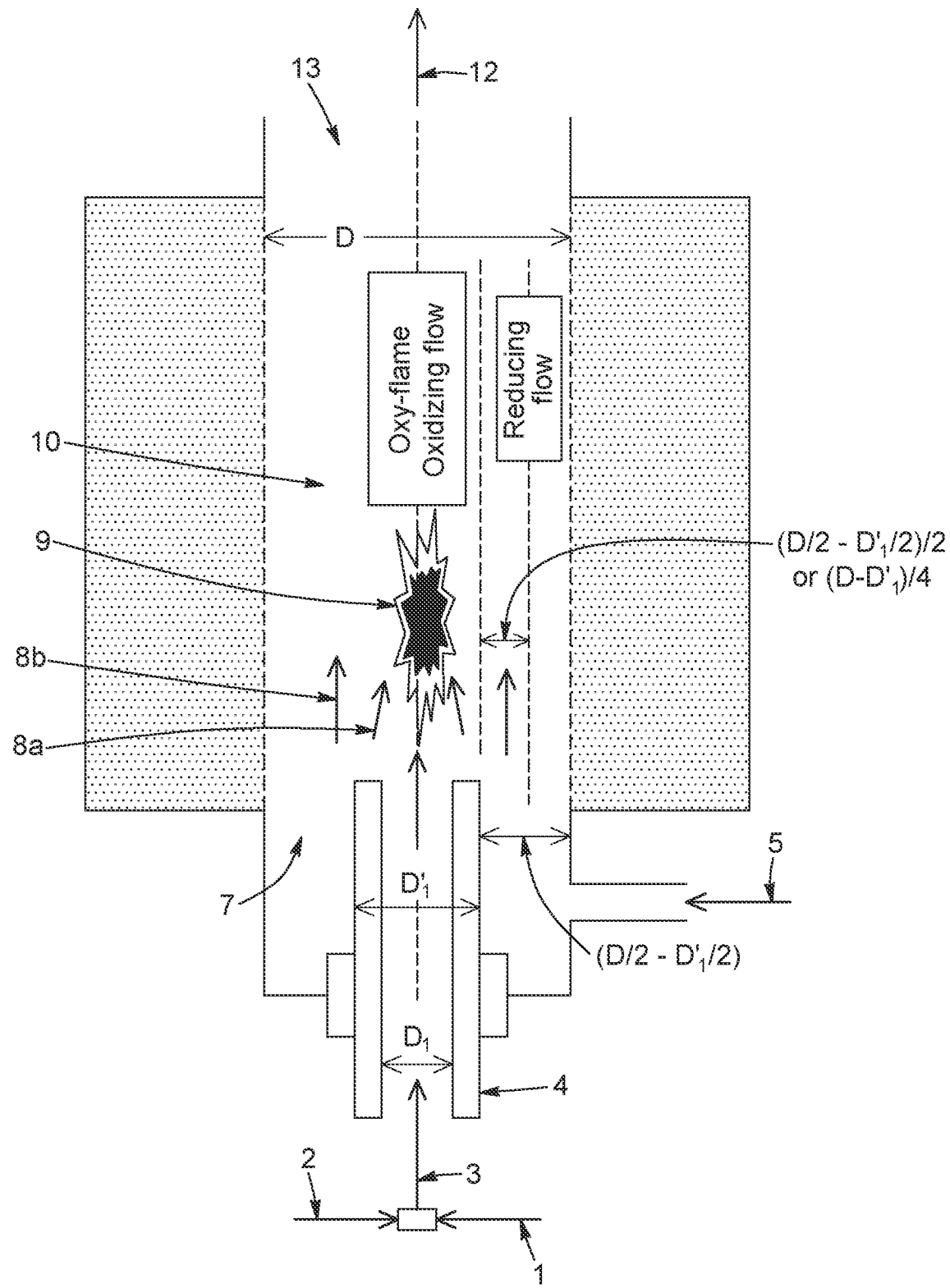
FIG. 3 shows certain distance parameters between the different flows and/or between different elements of the reactor according to one embodiment of the syngas production method.

A first embodiment of the syngas production method is shown in FIG. 2. This embodiment is particularly suited to the production of syngas from $CO_2$ as a carbon source. A stream comprising oxygen (1) is mixed with a stream comprising $CO_2$ (2) to produce an oxidizing stream (3) comprising a mixture of $O_2$ and $CO_2$. The oxidizing stream (3) is conveyed through a tube (4) allowing the injection of the mixture of $O_2$ and $CO_2$ inside the reaction chamber (10) of a reactor. Inside the reaction chamber (10), the mixture of $O_2$ and $CO_2$ forms an oxidizing flow (6), of which $O_2$ will be used to produce the Oxy-flame (9). A stream comprising hydrogen (5) is injected inside the reaction chamber through an annular space defined between the outer wall of the tube (4) and the circumference of an opening (7) at the entrance of the reaction chamber. The hydrogen stream (5) constitutes a reducing stream which, once inside the chamber, is going to form a reducing flow which itself divides into two parts: a first part (8a) of the reducing flow is going to react with the oxidizing flow (6) according to the hydrogen combustion reaction (F) to produce the Oxy-flame (9).

The second part (8b) of the hydrogen flow is used as the reagent ingredient for the RWGS reaction (A). The heat required for this reaction comes from the Oxy-flame (9).

Reactions (F) and (A) take place inside the reaction chamber (10) to form a gas mixture (12) composed of hydrogen, carbon monoxide, carbon dioxide and water vapor. The gas mixture (12) is also called wet syngas. This gas mixture (12) is discharged through the opening (13) of the reactor.

The reactor used for this embodiment comprises a wall (14) which can be filled with refractory and insulating materials (11). The volume of the reaction chamber (10) is determined by the cylindrical space defined by the length L and the diameter D. In the reactor, combustion can be initiated using a conventional ignition device such as for example an electric arc, an incandescent wire (not shown in the figure). According to one embodiment, the reactor can be equipped with a device allowing to measure the temperature inside the reaction chamber. Such a device can for example be a thermocouple (not shown in the figure). The injection tube (4) of the oxidizing stream (3) can be fixed by means of a device (15). According to some embodiments, the fixing device (15) can be used both as a guide for the injection tube (4) and as a sealing system. The fixing device (15) can for example comprise clamps with cable gland.

According to some embodiments, the length L of the reaction chamber can be between 1 cm and 300 cm, preferably between 10 cm and 100 cm. The diameter D of the reaction chamber can for example be between 0.3 cm and 100 cm, preferably between 1 cm and 50 cm. According to some embodiments, these values of length and diameter of the reaction chamber can also be applied to the reactors shown in FIGS. 2 to 5.

According to certain embodiments, the different gas flows can be characterized by certain parameters which will be defined below. Some of these parameters depend on different distances which are shown for example in FIG. 3.

The oxidizing flow (6) can be characterized by a velocity parameter v1 according to the following equation (G):

$$v1 = V1/((\pi/4) \bullet D_1^2) \tag{G}$$

where V1 corresponds to the volumetric flow rate of the oxidizing stream (3) at the temperature and pressure conditions in the reaction chamber, and $D_1$ is the inside diameter of the inlet tube (4) of the oxidizing stream (3). In the equations, the symbol "●" means "multiplied" and the symbol "^2" means "squared".

The diameter $D_1$ is such that the velocity v1 characterizing the oxidizing flow (6) is at least 1 m/s, based on the volumetric flow rate V1. According to another embodiment, the diameter $D_1$ is such that the velocity v1 is between 5 m/s and 150 m/s, preferably between 5 and 100 m/s. The velocity v1 can therefore be for example between 5 m/s and 90 m/s, between 5 m/s and 80 m/s, between 5 m/s and 70 m/s, between 5 m/s and 60 m/s, between 5 m/s and 50 m/s, between 5 m/s and 40 m/s, between 5 m/s and 30 m/s, between 5 m/s and 20 m/s, or between 5 m/s and 10 m/s.

The flow of the reducing flow (8a, 8b) is characterized by a velocity parameter v2 according to the following equation (H):

$$v2 = V2/((\pi/4) \bullet (D^2 - D'_1{}^2)) \tag{H}$$

where V2 is the volumetric flow rate of the reducing flow (8a, 8b) at the temperature and pressure conditions in the reaction chamber, D is the internal diameter of the reactor and $D'_1$ is the external diameter of the inlet tube (4) of the oxidizing current (3).

The opening (7) characterized by $(D/2 - D'_1/2)$ can be such that the velocity v2 of the reducing stream flowing in the annular space defined between the outer wall of the tube (4) and the circumference of the opening (7), will be at least 1 m/s based on the volumetric flow rate V2. According to another embodiment, the opening (7) $(D/2 - D'_1/2)$ is such that the velocity v2 is between 5 m/s and 150 m/s, preferably between 10 and 100 m/s. The velocity v2 can therefore be for example between 10 m/s and 90 m/s, between 10 m/s and 80 m/s, between 10 m/s and 70 m/s, between 10 m/s and 60 m/s, between 10 m/s and 50 m/s, or between 10 m/s and 40 m/s.

According to some embodiments, it is possible to define a parameter to characterize the proximity level between the reducing flow (8a, 8b) and the flow producing the Oxy-flame (9). This parameter can be defined by the distance d according to the following equation (I):

$$d = (D - D'_1)/4 \tag{I}$$

As previously indicated, the distance d can be between 0.1 mm and 100 mm, preferably between 0.3 mm and 50 mm, and preferably between 0.6 mm and 30 mm. The distance d can also be any distance within these value ranges.

According to one embodiment, the volume of the reaction chamber (10) of the reactor allows a certain residence time for all the reactants inside the reaction chamber (10) of at least 0.01 second. This residence time can be defined according to the following equation (J):

$$t = ((\pi/4) \bullet D^2 \bullet L)/(V1 + V2) \tag{J}$$

where L is the length of the chamber of reaction (10), i.e., the length of the interior volume of the reactor as shown for example on FIG. 2.

According to certain embodiments, V1 can be between 2 L/min (3.33E-5 m³/s) and 100000 L/min (1.67 m³/s), preferably between 5 L/min (8.33E-05 m³/s) and 50000 L/min (0.84 m³/s). According to some embodiments, V2 can be between 10 L/min (1.67E-04 m³/s) et 300000 L/min (5 m³/s), preferably between 25 L/min (4.17E-04 m³/s) and 200000 L/min (3.33 m³/s).

According to certain embodiments, the method for producing the syngas can be carried out using an $H_2/CO_2$ molar ratio of between 2 and 7. The $O_2/CO_2$ molar ratio can for example be between 0.35 and 0.9. The production of syngas can be carried out using, for instance, an $O_2/H_2$ molar ratio of between 0.1 and 0.3.

According to certain embodiments, the method for producing the syngas can be carried out using the following molar proportions of the different reagents:

$H_2/CO_2$ molar ratio between 2 and 7; and
$O_2/CO_2$ molar ratio between 0.35 and 0.9; and
$O_2/H_2$ molar ratio between 0.1 and 0.3.

The temperature reached inside the reaction chamber during the syngas production can be at least 600° C. This temperature can be at most 2200° C. It will be understood that the temperature can therefore vary between a value of 600° C. and 2200° C., and can therefore be for example 1000° C., 1100° C., 1200° C., 1300° C., 1400° C., 1500° C., 1600° C., 1700° C., 1800° C., 1900° C., 2000° C., 2100° C. and 2200° C. or any temperature between these values. It is understood that inside the reaction chamber, a temperature profile is established during the reaction. Thus, the temperature is not necessarily the same at a particular spot relative to another spot inside the reaction chamber. In other words, there are warmer and cooler areas inside the reaction chamber. When we talk about the temperature reached in the reaction chamber, we are therefore talking about a representative average temperature.

The temperature can vary depending on the pressure in the reaction chamber during the syngas production reaction. The pressure to carry out the syngas production reaction can be at least 0.5 atm. According to some embodiments, the production of syngas can be carried out at a pressure of not more than 3 atm. According to some embodiments, the pressure can therefore be 0.5 atm, 1 atm, 1.5 atm, 2 atm, 2.5 atm or 3 atm, or even any pressure between these values. For instance, the pressure can be between 1 atm and 3 atm.

In some embodiments, for a given flow rate of $CO_2$ and $H_2$, the $O_2$ feed rate can be adjusted so as to obtain a desired level of temperature and heat inside the reactor to operate the RWGS reaction. Furthermore, the flow rate of $H_2$ can be adjusted so as to obtain the $H_2/CO$ ratio or the R2 ratio defined by equation (E) that we wish to have for the gas mixture (12) discharged by the opening (13).

Figure 4:
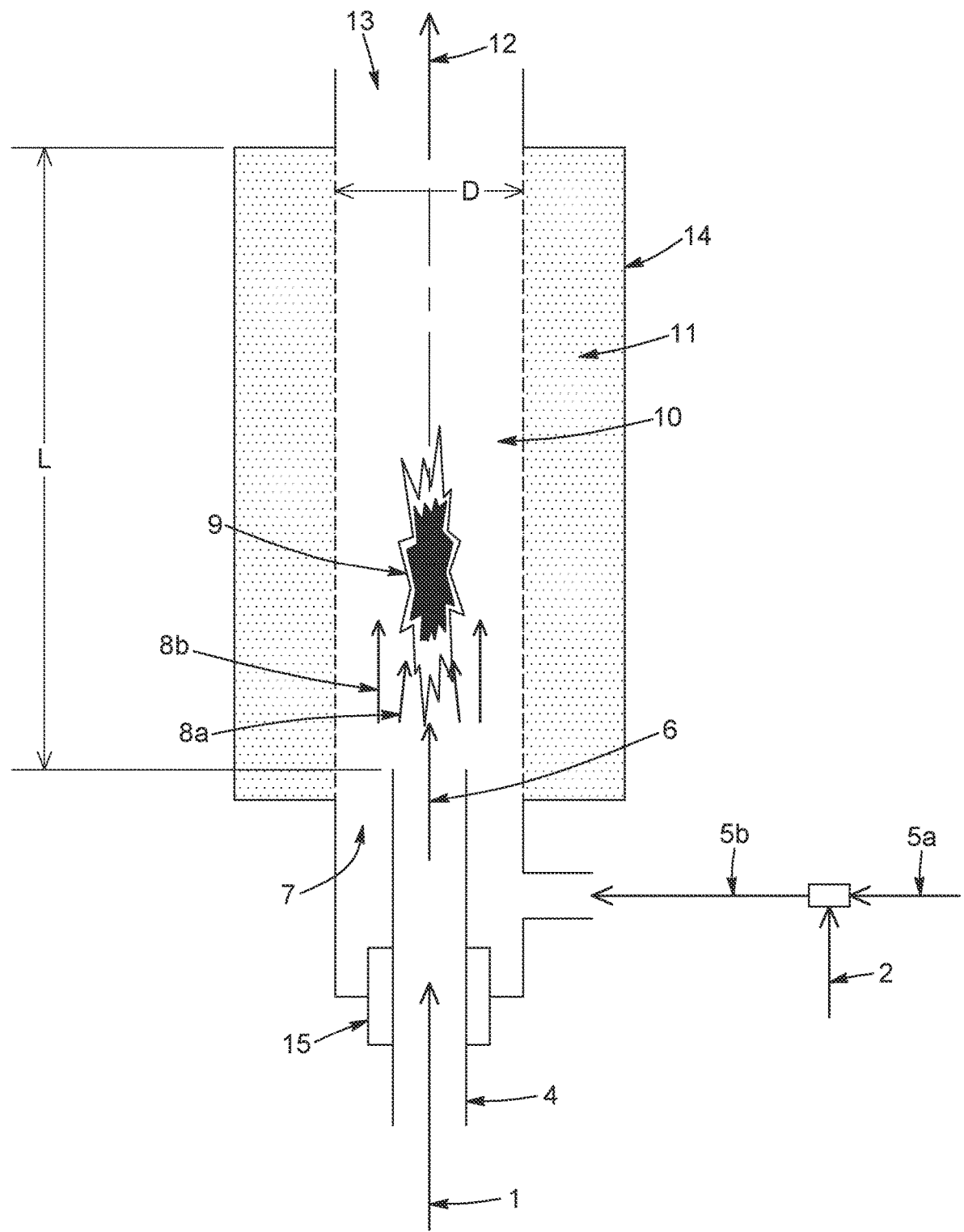
FIG. 4 shows a sectional view along the vertical of a reactor which can be used to carry out the syngas production method according to another embodiment.

FIG. 4 presents another possible embodiment of the syngas production method and of a reactor that can be used for this production. This embodiment is adapted for the production of syngas from any possible carbon source. In this case, a stream comprising a carbon source (2) is mixed with a stream of hydrogen (5*a*) to form a reducing stream (5*b*) which is then sent to the reactor. Even if the carbon source comprises $CO_2$ which is an oxidant, the mixture (5*b*) formed by mixing the gas comprising the $CO_2$ and the hydrogen, is, however, a reducing mixture since it is mainly composed of hydrogen. In some embodiments, the carbon source is $CO_2$ and the $H_2/CO_2$ molar ratio in the reducing stream can be at least about 2, and preferably at least 3. Once in the reaction chamber (10), the reducing stream (5*b*) becomes the reducing flow (8*a*, 8*b*). An oxidizing stream comprising $O_2$ (1) is fed into the reactor by means of the tube (4) to form the oxidizing flow (6). A first part (8*a*) of the reducing flow reacts with the oxidizing flow (6) to produce the Oxy-flame (9). The second part (8*b*) of the hydrogen flow which also contains the carbon source reacts using heat from the Oxy-flame (9). Given that the flow (8*b*) comprises an excess of hydrogen, the gas mixture (12) which is formed at the outlet of the reactor is composed of hydrogen, carbon monoxide, carbon dioxide and water vapor. This gas stream, or wet syngas, is discharged through the opening (13) of the reactor.

According to one embodiment, the carbon source forming the stream (2) can essentially comprise $CO_2$ and the reaction which takes place in the reaction chamber is the RWGS reaction (A).

According to another embodiment, the carbon source forming the stream (2) can comprise organic molecules of chemical formula $C_\alpha H_\beta O_\gamma$ where α can vary between 1 and 5, β can vary between 2 and 10 and γ can vary between 1 and 4. Other types of organic molecules can also form the stream (2), such as hydrocarbons such as alkanes (e.g., methane), alkenes, aromatics. These organic molecules can optionally be mixed with $CO_2$ in the stream (2).

When the carbon source comprises organic molecules of the $C_\alpha H_\beta O_\gamma$ type, the following reactions can occur in the reaction chamber:

Syngas formation according to equation (K):

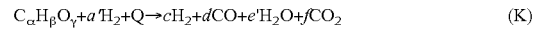
$$C_\alpha H_\beta O_\gamma + a'H_2 + Q \rightarrow cH_2 + dCO + e'H_2O + fCO_2 \tag{K}$$

Hydrogen combustion according to equation (L):

$$a''H_2 + bO_2 \rightarrow e''H_2O + Q \tag{L}$$

where a', a", b, c, d, e', e" and f are stoichiometric coefficients whose values depend on the molecules involved and the operating conditions considered to achieve the production of synthesis gas, and Q is the heat involved in the process.

With a=a'+a" and e=e'+e", the sum of equations (K) and (L) therefore gives the following stoichiometric equation (M):

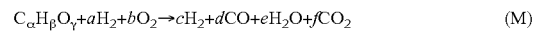
$$C_\alpha H_\beta O_\gamma + aH_2 + bO_2 \rightarrow cH_2 + dCO + eH_2O + fCO_2 \tag{M}$$

The stoichiometric coefficients can be determined starting from the chemical formula of the organic compound used as the carbon source.

For example, for α=1, the coefficients can have the following values:
a between 1 and 5
a" between 0.5 and 2
b between 0.25 and 1
c between 2 and 3
d between 0.5 and 1
e between 0.5 and 2.5
e" between 0.5 and 2
f between 0.15 and 0.75.

As mentioned above, stream (2) can comprise a mixture of $CO_2$ and organic molecules of formula $C_\alpha H_\beta O_\gamma$. In this case, both reactions (A) and (M) can occur in the reaction chamber to form the syngas.

When the carbon source comprises a hydrocarbon, production of syngas can take place in the reaction chamber in the presence of an oxidant to allow oxidation of the hydrocarbon. Such an oxidant can comprise water vapor and/or $CO_2$. The water vapor can be generated by the $H_2$ combustion reaction (F) during the formation of the Oxy-flame and/or can be fed independently into the reaction chamber.

If the carbon source comprises methane as a hydrocarbon, the following reactions can occur in the reaction chamber, depending on the oxidant involved (water vapor, $CO_2$):

$$CH_4 + H_2O \rightarrow CO + 3H_2 \tag{N}$$

$$CH_4 + CO_2 \rightarrow 2CO + 2H_2 \tag{O}$$

If the carbon source comprises a hydrocarbon of the formula $C_nH_m$, the following reaction can occur in the reaction chamber:

$$C_nH_m + nH_2O \rightarrow nCO + (n + \tfrac{1}{2}m)H_2 \tag{P}$$

Thus, the present method of producing syngas offers the possibility of using various carbon sources. For example, the carbon source can be a gas mixture produced by industrial processes such as biomass gasification or pyrolysis processes.

It should be noted that the various reaction parameters mentioned above in relation to FIG. 3 (pressure, temperature, distance, diameters, velocities, volumetric flow rates, residence time, etc.) can also be applied to the embodiment involving the different carbon sources which has just been presented in relation to FIG. 4.

Figure 5:
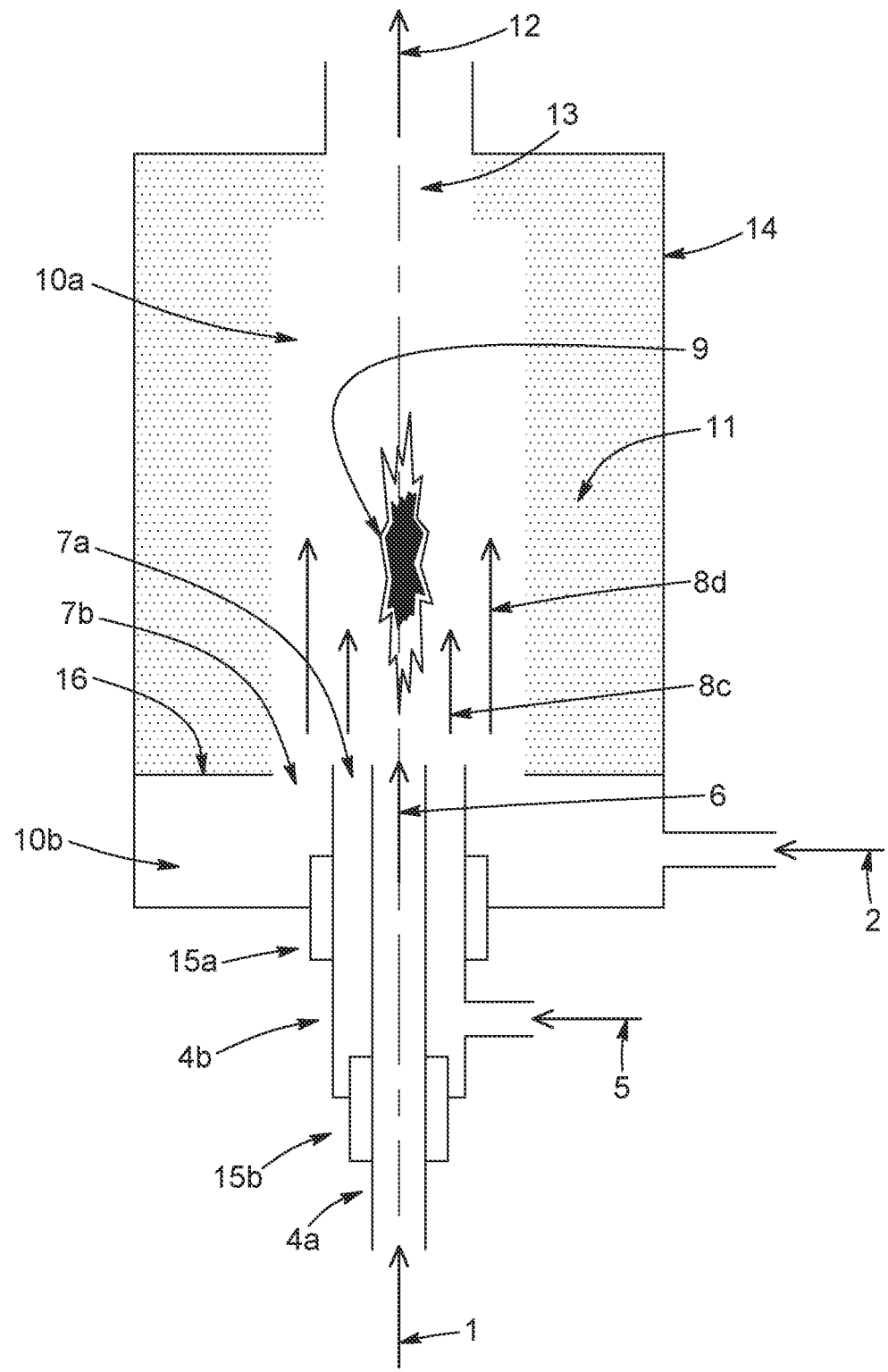
FIG. 5 shows a sectional view along the vertical of a reactor which can be used to carry out the method of producing syngas according to another embodiment.

FIG. 5 shows another embodiment of the method for producing syngas and of a reactor which can be used, among others, for this embodiment. As in the case of the embodiment presented in FIG. 4, the one in FIG. 5 is adapted for the production of syngas from any possible carbon source (e.g., $CO_2$, molecules de formula $C_\alpha H_\beta O_\gamma$, hydrocarbons or their mixtures). As shown in FIG. 5, the Oxy-flame (9) can be produced by injecting oxygen and hydrogen by means of two distinct concentric tubes (4a and 4b), as will be explained in more detail below. In this embodiment, the reactor comprises in its lower part a central tube (4a) which fits into a second tube of larger diameter (4b). The central tube (4a) can be attached to the larger tube (4b) by means of a fixing device (15b) such as a sealing device. The second wider tube (4b) can itself be attached to the wall (14) of the reactor by means of a fixing device (15a) which is preferably similar to the fixing device (15b). The interior of the reactor is divided into two compartments (10a and 10b). The two compartments (10a, 10b) are separated by a wall (16) provided with an opening (7b). The first compartment (10a) constitutes the reaction chamber of the reactor.

As can be seen in FIG. 5, an oxygen-based oxidizing stream (1) is injected into the central tube (4a), while a stream comprising hydrogen (5) is injected into the second tube (4b). The hydrogen stream (5) passes through an opening defined by the annular space (7a) between the inner wall of the median tube (4b) and the outer wall of the central tube (4a). A stream (2) comprising a carbon source is injected inside the compartment (10b) which can be qualified as a distribution chamber, and then passes through the opening (7b) to enter the reaction chamber (10a). In the reactor, the $O_2$ stream (1) becomes an oxidizing flow (6), the $H_2$ stream (5) becomes a hydrogen flow (8c) and the stream (2) comprising the carbon source ends up in a third flow (8d). The oxygen flow (6) and part of the hydrogen flow (8c) are used for the production of the Oxy-flame (9), while the hydrogen in excess, i.e., which is not burned, reacts with the flow comprising the carbon source (8d). One understands that, even if directly at the entrance to the reaction chamber, one will have a $H_2$ flow (8c) distinct from a flow (8d) comprising the carbon source, these two flows (8c) and (8d) no longer constitute completely separate flows as soon as they enter the reaction chamber, and they can then each comprise both $H_2$ and the carbon source once in the reaction chamber.

In the embodiment illustrated in FIG. 5, the stream comprising the carbon source (2) can be $CO_2$. However, the stream (2) can also include other compounds such as organic molecules and/or hydrocarbons as described above while being free of $CO_2$. In addition, according to some embodiments, the stream (2) can also comprise hydrogen. Thus, a certain quantity of hydrogen can be fed into the median tube (4b) to be used to form the hydrogen flow (8c) while another part of hydrogen can be mixed with $CO_2$ and/or organic and/or hydrocarbon vapors to form the flow (8d).

It should be noted that the various reaction parameters mentioned above in relation to FIG. 3 (pressure, temperature, velocities, diameters, volumetric flow rates, residence time, etc.) can also be applied to the embodiment involving the different carbon sources which has just been presented in relation to FIG. 5.

Figure 6A:
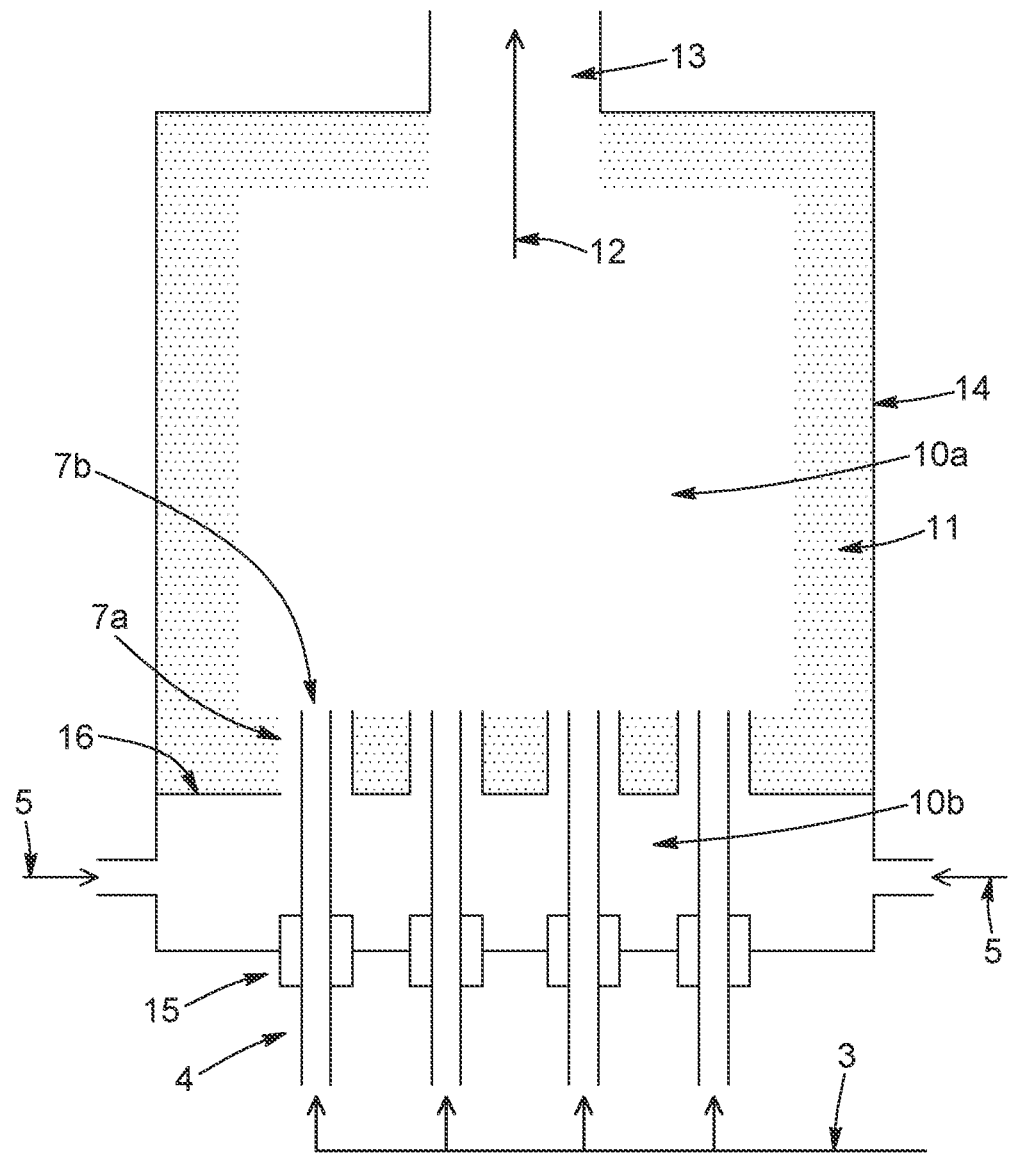
FIG. 6a shows a sectional view along the vertical of a reactor which can be used to carry out the syngas production method according to another embodiment.
Figure 6B:
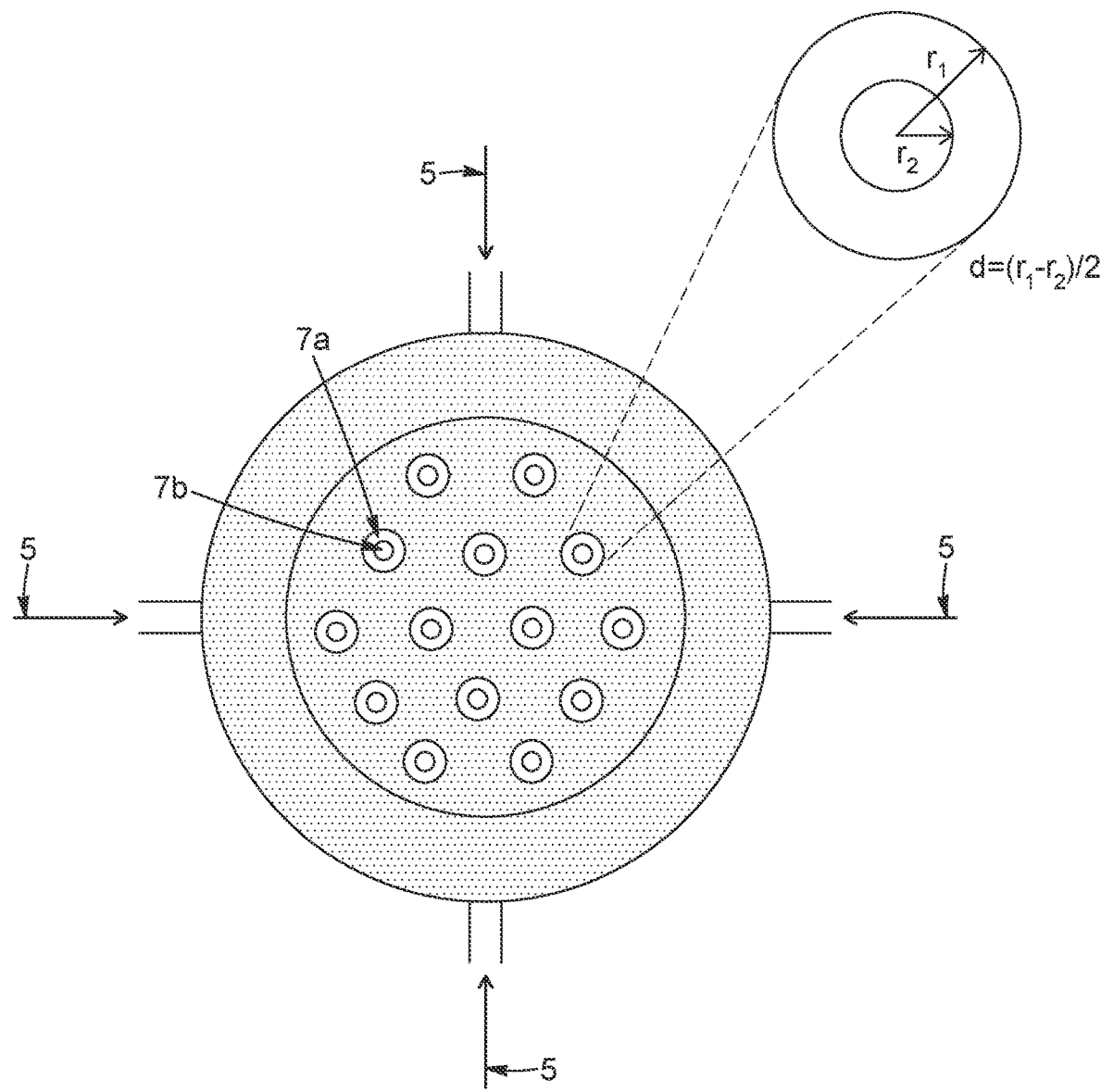
FIG. 6b shows a top cross-sectional view of the reactor of FIG. 6a. An enlarged view of two concentric tubes is also shown in FIG. 6b to explain the distance parameter according to this embodiment.

FIGS. 6a and 6b show an embodiment of the syngas production method using a high capacity reactor. As for the embodiment presented in relation to FIG. 2, the embodiment of FIGS. 6a and 6b is particularly suitable for the production of syngas from $CO_2$ as a carbon source. According to this embodiment, the reactor can comprise a wall (14) and an insulating and refractory material (11) to protect the reaction chamber (10a). A distribution chamber (10b) is arranged in the lower part of the reactor in communication with the reaction chamber (10a). The distribution chamber receives the reducing stream (5) comprising hydrogen before it enters the reaction chamber. The reaction chamber (10a) is separated from the reducing stream distribution chamber (10b) by a wall. The wall can be made of refractory material with insulation and be supported by a plate (16). The plate (16) can for example be a metal plate. The compartment (10b) can be traversed by a multitude of concentric tubes (4) which can be fixed to the reactor wall (14) in the lower part of the compartment (10b). The tubes (4) can be fixed to the wall (14) by means of a sealing device (15). The fixing and sealing devices (15) can also be used as guides to maintain the position of the tubes (4). The concentric tubes (4) extend through the distribution chamber (10b) up to the lower part of the reaction chamber (10a) to form a multitude of inlet ports (7b) through which the oxidizing stream (3) is injected into the reaction chamber. In addition, the wall between the distribution chamber and the reaction chamber is provided with openings forming a multitude of inlet ports (7a) of radius $r_1$ through which the reducing stream (5) can penetrate inside the reaction chamber. According to a preferred embodiment, the openings (7a) form an annulus around the tubes (4) as can be seen in FIG. 6b. The inlet ports (7b) of radius $r_2$ can be concentric with respect to the inlet ports (7a). The reducing stream (5) can be injected into the distribution chamber (10b) through more than one inlet port. In FIG. 6b, one sees that the reactor can be provided with at least 4 inlet ports for the reducing stream (5). In addition, as shown in FIG. 6a, the reactor can comprise a multitude of tubes (4) for injecting the oxidizing stream (3) into the reaction chamber (10a). Finally, the reactor according to this embodiment also comprises an outlet (13) to allow discharging the syngas produced in the reaction chamber.

According to this embodiment, several Oxy-flames can form in the reaction chamber. The distance parameter between the reducing flow and the oxidizing flow (Oxyflame) for this embodiment can be defined as follows:

$$d=(r_1-r_2)/2 \qquad (Q)$$

As for all embodiments, the distance d can preferably be between 0.1 mm and 100 mm. According to another embodiment, the distance d separating the two flows can be between 0.3 mm and 50 mm, or even preferably between 0.6 mm and 30 mm. The distance d can also be any distance within these ranges of values.

As mentioned above, according to some embodiments, the hydrogen which is needed in the reducing stream and which is used to obtain the syngas, can be produced from renewable resources. Notably, the hydrogen can be produced from a water electrolysis system powered by electricity from renewable sources. The stream comprising the carbon source (e.g., $CO_2$) which is also needed as a reagent, can itself be a gas mixture resulting from biomass gasification or pyrolysis techniques, as mentioned above. Thus, overall, it is possible to produce syngas from a captured carbon source, water and electricity from renewable sources.

Figure 7:
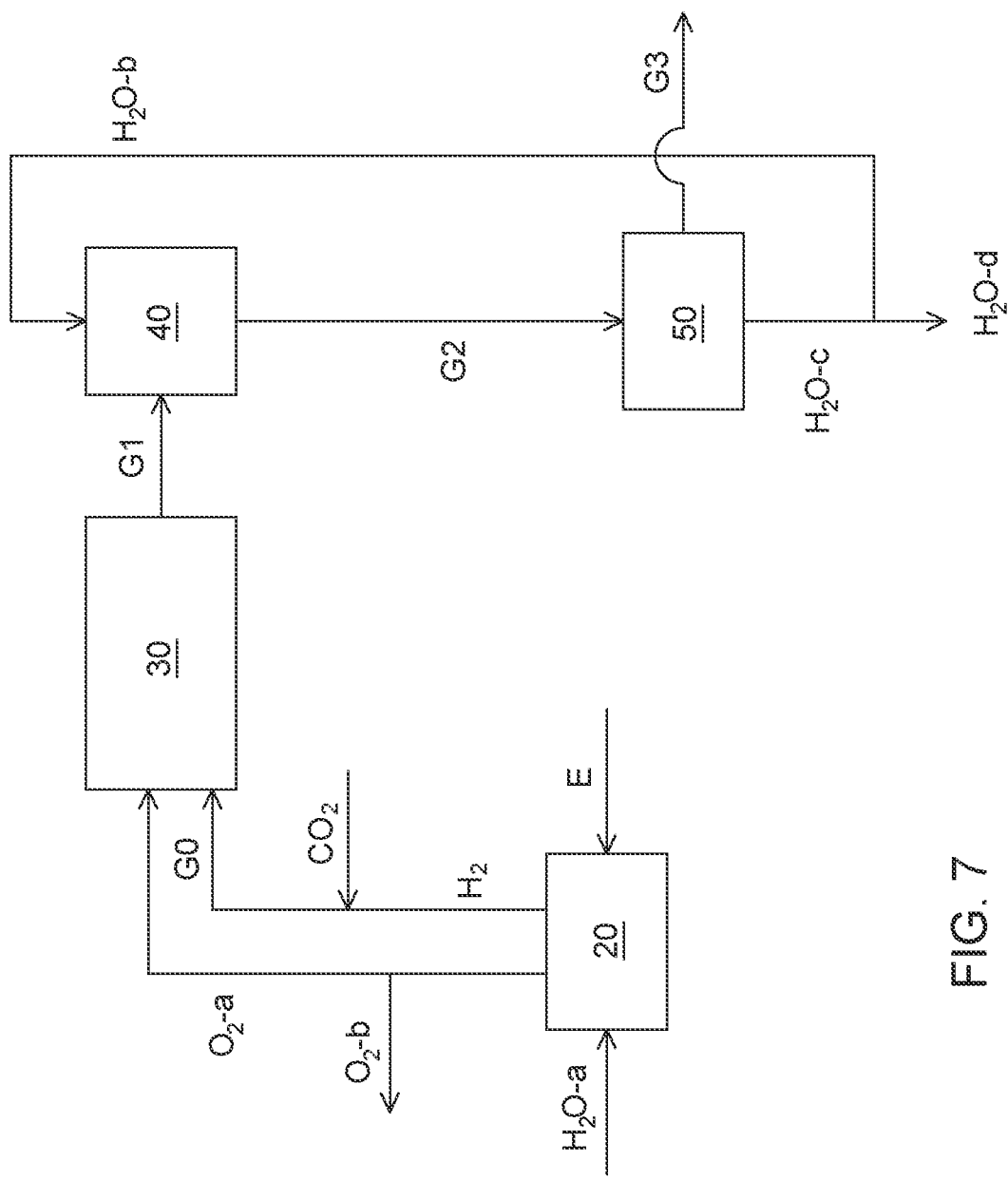
FIG. 7 shows a diagram of the syngas production process according to yet another embodiment.

This embodiment of the method of producing syngas from renewable resources is shown on part of FIG. 7. FIG. 7 also shows additional steps, comprising for example the recovery of water formed during the synthesis gas production reaction. Thus, FIG. 7 shows the following steps:
- electrolysis (20) of the water supplied ($H_2O$-a) by electricity from renewable sources (E);
- production of syngas (30) according to one of the embodiments described above;
- cooling of the produced gases (40), for example by means of direct contact cooling;
- water recovery ($H_2O$-c) by condensation (50).

Specifically, as can be seen in FIG. 7, the electrolysis system (20) is fed with water ($H_2O$-a) to produce hydrogen ($H_2$) and oxygen. The hydrogen ($H_2$) produced by electrolysis is mixed with a gas comprising $CO_2$ and/or another carbon source, preferably $CO_2$. This gas comprising $CO_2$ and/or another carbon source, can derive, at least in part, from a process of gasification or pyrolysis of biomass. The resulting mixture (G0) forms a reducing stream which can then be used for the production of syngas (30). One part of the oxygen ($O_2$-a) produced by the electrolysis (20) is sent to the production of syngas (30), where it can be used to generate the Oxy-flame. The other part of the oxygen ($O_2$-b) produced by the electrolysis (20) can be discharged.

The gas (G1) resulting from the production of syngas (30) is then rapidly cooled (40) in order to limit/prevent the reverse reaction of reaction (A) from occurring. Cooling can be carried out using a conventional method. According to a preferred embodiment, the cooling (40) can be carried out by means of a direct contact cooler with a stream of water ($H_2O$-b). According to one embodiment, the gas (G1) is cooled to a temperature above the dew point of the hot gas and not exceeding 250° C. According to some embodiments, the dew point of the hot gas (G1) is less than 90° C. at atmospheric pressure. For example, the dew point of hot gas (G1) is between 60° C. and 90° C. at atmospheric pressure. According to some embodiments, the gas (G1) can be cooled to a temperature between 90° C. and 250° C.

The cooled gas (G2) obtained after the cooling (40) is a wet gas. This gas (G2) can then undergo a second cooling which can be carried out by condensation (50). According to some embodiments, this condensation can be carried out using a cooler-condenser. According to a preferred embodiment, the condensation step (50) can be carried out such that the gas (G2) is cooled to a temperature of 35° C. and below. At the outlet of the cooler-condenser, one obtains on the one hand syngas (G3) and on the other hand condensed water ($H_2O$-c). Part of the condensed water ($H_2O$-c) can be recycled ($H_2O$-b flow) to the cooling stage (40) while the other part of the condensed water can be discharged ($H_2O$-d flow). According to some embodiments, the $H_2O$-d flow can be used, at least in part, to supply water to the electrolysis system (20).

As mentioned previously, the syngas production method described in the present document can allow producing CO and $H_2$ based gas mixtures based (syngas) which are balanced, i.e., with appropriate proportions of CO and $H_2$, to then allow the production of a variety of products by conventional chemical syntheses. Thus, it is possible, by controlling the nature and the quantity of reagents used (e.g., the flow rate of the gas streams), to produce a syngas where the proportion of CO and $H_2$ is adapted such that the mixture is directly usable in a subsequent chemical synthesis. It is also possible to play on the proportion of CO and $H_2$ in the syngas, by controlling the temperature, the pressure and the $O_2$ feed rate in the reaction chamber. In addition, the temperature in the reactor can be controlled by the flow rate of oxygen supplied. According to one embodiment, the syngas produced contains $H_2$ and CO in a molar ratio $H_2/CO \geq 2$. The syngas produced by the described method can also contain $CO_2$. In this case, the molar ratios of $H_2$, CO and $CO_2$ in the syngas can be such that $(H_2-CO_2)/(CO+CO_2) \geq 2$.

By respecting these molar ratios, the syngas produced by the present method can be used to produce a large number of commodity chemicals. Amongst these products, we can particularly find methanol and hydrocarbons such as those found in motor gasoline, diesel, kerosene, to name a few examples.

The syngas production method described above and the reactor that can be used to perform this method therefore have several advantages. The reagents are easily accessible and can be derived from renewable sources. It is not necessary to resort to the use of solid catalysts. The conversion rate of the reactants can also be greater than the conversion rate observed in the case of a RWGS reaction carried out in a conventional manner in the presence of a catalyst. Finally, the present method is characterized by its robustness, in that it is versatile and simple to implement. These advantages therefore make it possible to reduce production costs in addition to the beneficial environmental effect of recycling carbon sources such as $CO_2$ for example.

EXAMPLES

Example 1

Figure 8:
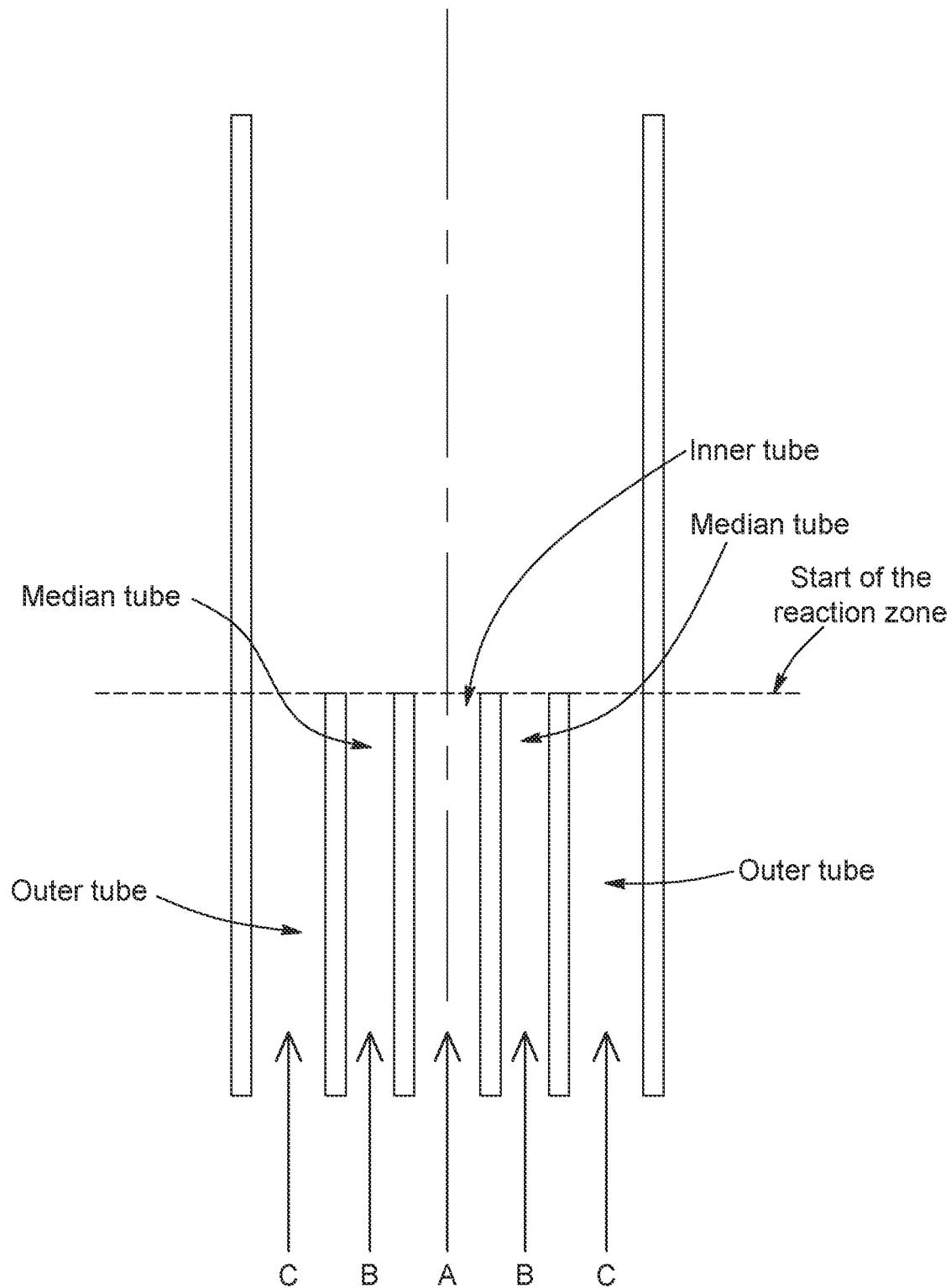
FIG. 8 shows a schematic sectional view along the vertical of a mini reactor used for the examples. The figure shows the general arrangement of the tubes for this mini reactor.

This example is based on a small reactor as shown schematically in FIG. 8. This mini reactor operates according to a scenario involving the co-injection of premixed $O_2$ and $CO_2$, inside the inner tube, i.e., in space A, and injection of $H_2$ into annular space B. The reactor was built from small tubes in Inconel 600™. The following dimensions are used to characterize the geometry of the mini reactor (I.D.=internal diameter; E.D.=external diameter) where L corresponds to a length from the start of the reaction zone (dimensions in mm):
- Outer tube: I.D.=10.41; E.D.=12.7; L=371.83
- Median tube: I.D.=7.752; E.D.=9.53; L≈0 (start of reaction zone)
- Inner tube: I.D.=3.048; E.D.=6.35; L≈0 (start of reaction zone)

An ignition system used to ignite a pulsoreactor, i.e., a spark plug with ignition at 20 kV, was inserted inside the reactor, very close to the upper end of the inner and median tubes. A perforation was made to allow the spark plug to be inserted (not shown in the figure for clarity). The change in the temperature level in the reactor is monitored using thermocouples. The temperature is measured in a lower part and also in an upper part of the reaction zone inside the mini reactor. That is, one temperature reading near the base of the reaction zone (where gases are injected) specifically 13 mm higher than the line at the start of the reaction zone (see FIG. 8) and another reading at 89 mm higher than the line at the start of the reaction zone (see FIG. 8), are carried out. The thermocouples were installed by means of T-connectors (not shown in the figure).

The experimental set-up includes the following: the reactor itself, a tube and jacket heat exchanger allowing rapid cooling of the gases leaving the reactor, a condensate recovery tank, a gas relative humidity (RH) analysis system, and finally, an analysis system ($CO_2/CO/C_xH_y/O_2$) to allow measuring the contents in CO, $CO_2$, hydrocarbons ($C_xH_y$) as well as the oxygen content of the gas produced, at the outlet of the gas cooling system.

A system of mass flow meters with automated control valves is also set up. The system is provided with a software for programming changes in the composition of the gas mixture introduced into the reactor. Finally, manual valves are used to direct each of the gases into the desired reactor tube.

To avoid flashbacks on ignition, ignition is carried out in stages (lasting approximately 1 second). The main stages of the ignition sequence comprise: 1) start the $H_2$ injection, 2) after a few seconds, inject the oxygen in successive stages until the desired flow rate, each stage lasting a few seconds, 3) start the $CO_2$ injection.

Once ignition occurs, one can proceed to the analysis steps as such. Each of these stages has a duration of 60 seconds. After this period of time, the various measurements are carried out. The input flow rates (standard liters (SL) at 25° C., 1 atm per min) are as follows:
$CO_2$: 1.3 SL/min
$O_2$: 0.93 SL/min
$H_2$: 6.1 SL/min
The $CO_2$ and $O_2$ flows are premixed. The operating pressure is nearly 1 atm.

The following results were obtained:
CO molar concentration in the gas: 22.2%
$CO_2$ molar concentration in the gas: 8.1%
Hydrocarbon molar concentration: trace
$CO/CO_2$ molar ratio in the produced gas: 2.74
$CO_2$ to CO conversion rate: 73%
Average temperature in the reaction chamber: 686° C.
Velocity of the $O_2/CO_2$ mixture at the inlet (at average temperature, 1 atm): 16.4 m/s
Velocity of $H_2$ at the inlet (at average temperature): 21.1 m/s
Residence time in the reactor (s): <0.06 s
Ratio R2=($H_2$—$CO_2$)/(CO+$CO_2$): 2.26

For the calculation of the R2 ratio, the concentration of $H_2$ is calculated from an atomic balance. The atomic balance is itself carried out taking into account all the inputs ($CO_2$, $H_2$, $O_2$) and taking into account the composition of the outgoing gas (CO and $CO_2$ content, hydrocarbon content expressed in $CH_4$ equivalent, gas humidity, residual oxygen content). The atomic balance on the hydrogen atoms makes it possible to calculate the hydrogen composition of the gas at the outlet of the reactor.

Example 2

In this example, the same device as for Example 1 is used, but with injection of $O_2$ into the inner tube (space A), injection of $H_2$ into the annular space between the median tube and the inner tube (space B), and injection of a $CO_2/CH_4$ equimolar mixture into the annular space between the outer tube and the median tube (space C). The input flow rates (standard liters at 25° C., 1 atm per min) are as follows:
$CO_2$: 0.40 SL/min
$CH_4$: 0.40 SL/min
$O_2$: 0.9 SL/min
$H_2$: 3.3 SL/min
These three flows are injected separately into the mini reactor. The following results were obtained:
CO concentration in the dry gas: 13.3%
$CO_2$ molar concentration in the gas: 10.2%
Hydrocarbon molar concentration in the gas: 2135 ppm
$CO/CO_2$ ratio in the produced gas: 1.30
$CO_2$ conversion rate: 13.1%
$CH_4$ conversion rate: 98.2%
Average temperature: 855° C.
Velocity of the $O_2$ at the inlet (at average temperature, 1 atm): 7.77 m/s
Velocity of the $H_2$ at the inlet (at average temperature, 1 atm): 13.4 m/s
Velocity of the $CO_2/CH_4$ mixture at the inlet (at average temperature, 1 atm): 7.46 m/s
Reagent residence time: <0.07 s
R2=($H_2$—$CO_2$)/(CO+$CO_2$): 2.87
For the calculation of the ratio R2, the concentration of $H_2$ is calculated from an atomic balance.

Example 3

In this example, the same reactor as for Example 1 is used, but the outer Inconel™ tube is replaced by a quartz tube. The length of the reaction chamber is the same. For this example, the $CO_2$ and $O_2$ flows are premixed. The resulting mixture is injected inside the inner tube (space A), while hydrogen is injected inside space B. The operating pressure is nearly 1 atm. Since the temperature cannot be measured directly, the temperature used is a thermodynamic equilibrium temperature value calculated to obtain a gas with the same $CO/CO_2$ ratio as what has been measured.

Les débits des intrants (litres standard à 25° C., 1 atm par min) sont les suivants:
$CO_2$: 1.3 SL/min
$O_2$: 0.93 SL/min
$H_2$: 6.2 SL/min
The input flow rates (standard liters at 25° C., 1 atm per min) are as follows:
CO concentration in the gas: 22.9%
$CO_2$ concentration in the gas: 7.30%
Hydrocarbon molar concentration: trace
$CO/CO_2$ ratio in the produced gas: 3.14
$CO_2$ to CO conversion rate: 75.8%
Equilibrium temperature T: 1230° C.
Velocity of $O_2/CO_2$ mixture at the inlet (at temperature T, 1 atm): 25.6 m/s
Velocity of $H_2$ at the inlet (at temperature T and 1 atm): 33.7 m/s
Reagent residence time: <0.04 s
R2=($H_2$—$CO_2$)/(CO+$CO_2$): 2.34
For the calculation of the ratio R2, the $H_2$ concentration of the gas leaving the reactor is calculated from an atomic balance. Comparison of the results of Example 1 with those of Example 3 shows that the nature of the materials of the reactor (Inconel™ versus quartz) has no significant influence on the $CO_2$ conversion rate.

Example 4

This example uses the same equipment as Example 3, i.e., based on using a quartz tube as the outer tube. In this example, $O_2$ is injected into space A, $H_2$ is injected into space B and $CO_2$ into space C. Since the temperature cannot be measured directly, the temperature used is a thermodynamic equilibrium temperature value calculated to obtain a gas having the same $CO/CO_2$ ratio as what has been measured. The input flow rates (standard liters (SL) at 25° C., 1 atm) per min) are as follows:
$CO_2$: 1.3 SL/min O$_2$: 0.93 SL/min
H$_2$: 6.1 SL/min
The following results were obtained:
CO concentration in the gas: 18.21%
CO$_2$ concentration in the gas: 11.5%
Hydrocarbon concentration: trace
CO/CO$_2$ ratio in the gas: 1.58
CO$_2$ to CO conversion rate: 61.2%
Equilibrium temperature T: 877° C.
O$_2$ velocity (at temperature T): 8.20 m/s
H$_2$ velocity (at temperature T, 1 atm): 25.4 m/s
CO$_2$ velocity (at temperature T, 1 atm): 9.02 m/s
Residence time in the reactor: <0.05 s
R2=(H$_2$—CO$_2$)/(CO+CO$_2$): 2.26

For the calculation of the ratio R2, the H$_2$ concentration in the gas leaving the reactor is calculated from an atomic balance.

Applicability of the synthesis gas production process has been demonstrated in the above examples, inter alia, on the basis of the use of CO$_2$ as a carbon source. CO$_2$ is a very chemically stable molecule, and much more stable than a C$_\alpha$H$_\beta$O$_\gamma$ molecule where α is between 1 and 5. Since the above examples have shown that the process is applicable for CO$_2$ which turns out to be more difficult to transform chemically than a molecule of the C$_\alpha$H$_\beta$O$_\gamma$ type, it is reasonable to conclude that the method is also applicable to molecules of the C$_\alpha$H$_\beta$O$_\gamma$ type as a carbon source.

Although some embodiments of the present method, and of the reactor which can be used to perform this method, have been described above, the method and the reactor are not limited to these sole embodiments. Several modifications could be made to one or the other of the embodiments described above, without departing from the scope of the present technology as contemplated.

The invention claimed is:

1. A method of producing synthesis gas comprising carbon monoxide (CO) and hydrogen (H$_2$), wherein the synthesis gas is produced by a reduction reaction of a first flow comprising a carbon source and an excess of hydrogen in contact with an Oxy-flame, and wherein:
    the hydrogen comes from a reducing stream, a first part of which ends up in the first flow and a second part is used to generate the Oxy-flame by combustion of hydrogen in the presence of a second flow comprising oxygen (O$_2$), the second flow coming from an oxidizing stream,
    the first flow and the second flow are at a distance from each other such that the Oxy-flame supports the reaction between the carbon source and the hydrogen,
    the distance between the first flow and the second flow is comprised between 0.1 mm and 100 mm,
    the carbon source comprises at least CO$_2$, and
    the reduction reaction is carried out in the absence of solid catalyst.

2. The method according to claim 1, wherein the Oxy-flame generates ionic species and free radicals which promote the conversion of the carbon source to CO.

3. The method according to claim 1, wherein the carbon source is CO$_2$ or comprises CO$_2$ in combination with:
    at least one type of oxygenated molecules of formula C$_\alpha$H$_\beta$O$_\gamma$ wherein α is between 1 and 5, β is between 2 and 10 and γ is between 1 and 4;
    one or more hydrocarbons; or
    a mixture thereof.

4. The method according to claim 1, wherein the reduction reaction comprises a reverse reaction of gas to water or "Reverse Water Gas Shift".

5. The method according to claim 1, wherein the reducing stream is hydrogen.

6. The method according to claim 1, wherein the reducing stream comprises hydrogen and the carbon source.

7. The method according to claim 1, wherein the reducing stream comprises hydrogen and the carbon source comprising at least CO$_2$.

8. The method according to claim 1, wherein the oxidizing stream is oxygen.

9. The method according to claim 1, wherein the oxidizing stream comprises oxygen and the carbon source the carbon source comprising at least CO$_2$.

10. The method according to claim 1, wherein the reducing stream comprises only hydrogen, the oxidizing stream comprises only oxygen and the carbon source is supplied by an independent stream.

11. The method according to claim 10, wherein the independent stream comprises CO$_2$ or the independent stream comprises CO$_2$ and methane.

12. The method according to claim 1, wherein the oxygen comes from a water electrolysis reaction and/or the hydrogen comes from a water electrolysis reaction and/or the carbon source comes from a gas mixture resulting from a biomass gasification or pyrolysis process.

13. The method according to claim 1, wherein the reduction reaction is carried out at an average temperature of at least 600° C.

14. The method according to claim 1, wherein the distance between the first flow and the second flow is comprised between 0.3 mm and 50 mm.

15. The method according to claim 1, wherein the reduction reaction is carried out using an H$_2$/CO$_2$ molar ratio of between 2 and 7.

16. The method according to claim 1, wherein the reduction reaction is carried out using an O$_2$/CO$_2$ molar ratio of between 0.35 and 0.9.

17. The method according to claim 1, wherein the reduction reaction is carried out using an O$_2$/H$_2$ molar ratio of between 0.1 and 0.3.

18. The method according to claim 1, wherein the carbon source is CO$_2$, or comprises CO$_2$ and at least one hydrocarbon.

19. The method according to claim 1, wherein the carbon source is CO$_2$.

20. The method according to claim 1, wherein the carbon source comprises CO$_2$ and methane.

* * * * *